L. X. CHAMPEAU.
ILLUMINATING MEANS.
APPLICATION FILED APR. 18, 1919.
1,364,866.
Patented Jan. 11, 1921.
2 SHEETS—SHEET 2.
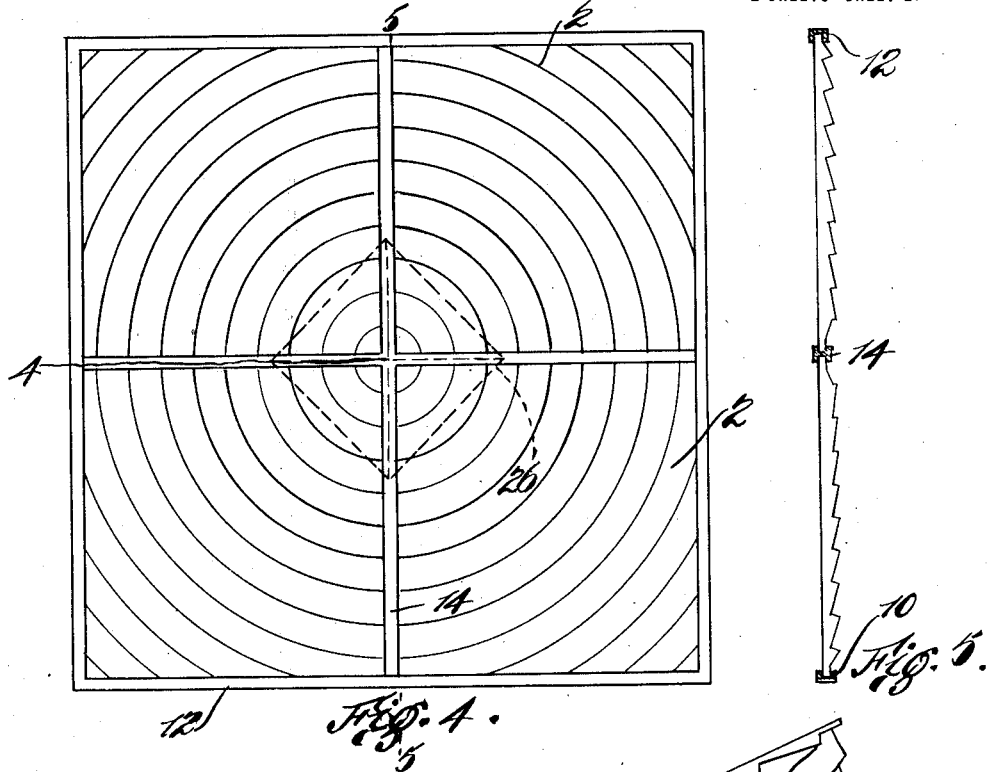
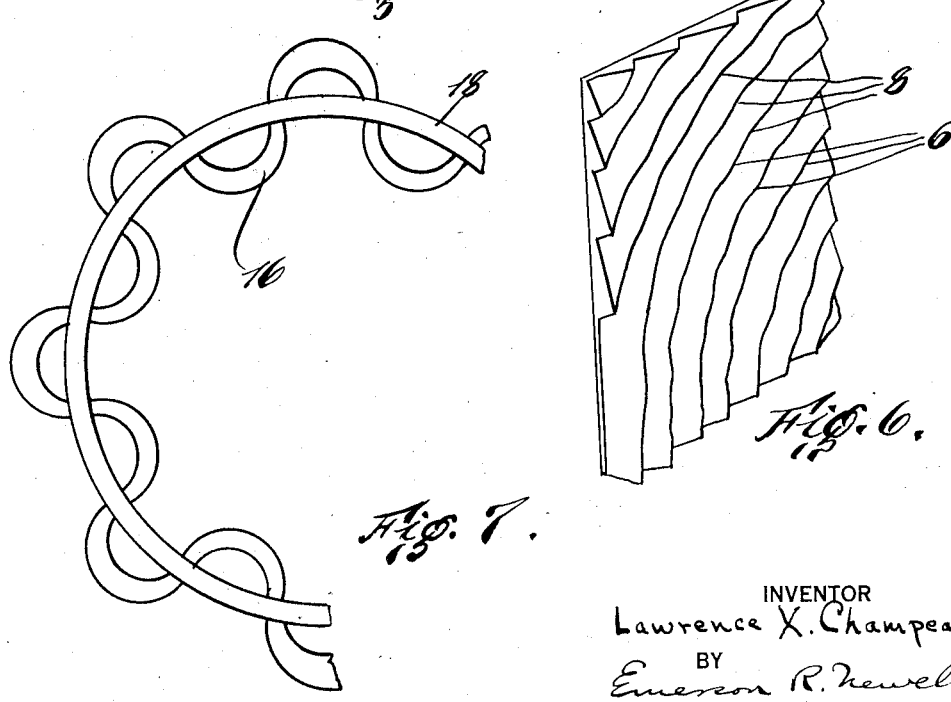
INVENTOR
Lawrence X. Champeau
BY
Emerson R. Newell
ATTORNEY

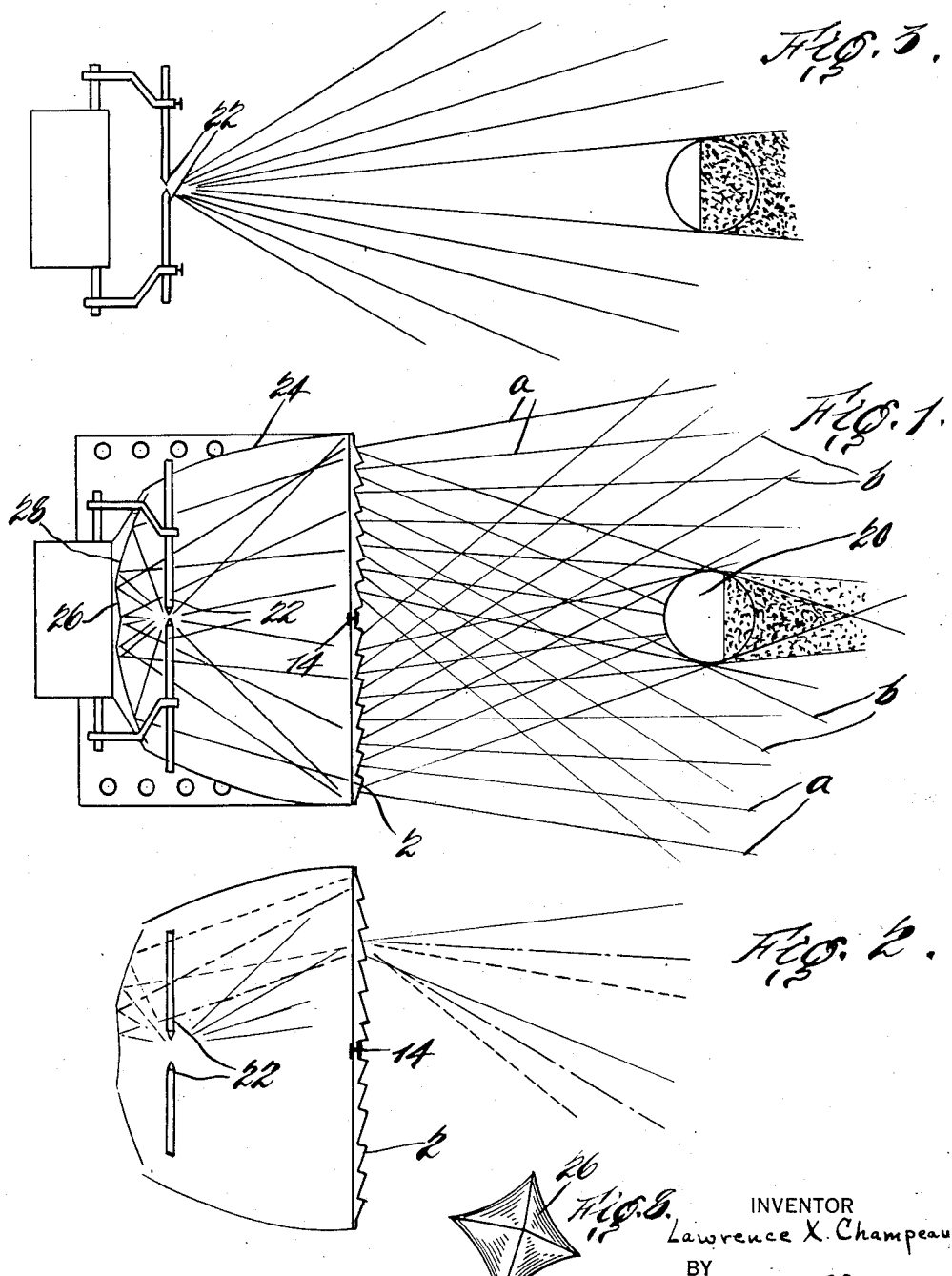

UNITED STATES PATENT OFFICE.

LAWRENCE X. CHAMPEAU, OF JERSEY CITY, NEW JERSEY, ASSIGNOR TO KIRBY, CHAMPEAU CO., INC., OF NEW YORK, N. Y., A CORPORATION OF NEW YORK.

ILLUMINATING MEANS.

1,364,866.    Specification of Letters Patent.    Patented Jan. 11, 1921.

Application filed April 18, 1919. Serial No. 290,937.

*To all whom it may concern:*

Be it known that I, LAWRENCE X. CHAMPEAU, a citizen of the United States, residing at Jersey City, New Jersey, have invented certain new and useful Improvements in Illuminating Means, of which the following is a clear, full, and exact description.

This invention relates to illuminating devices of the general class of those which are adapted to direct or to distribute the light from an artificial source and more particularly to illuminating means by which an effect may be secured like that from a luminous source having a relatively wide area of intrinsic brilliancy.

In the illumination of art galleries, show windows, photographic studios, and particularly in the illumination of motion picture studios, great difficulty has been experienced in obtaining satisfactory results, particularly by reason of the failure to obtain uniform distribution of the light throughout the area or space to be illuminated and to overcome the tendency to the formation of intense shadows resulting from having too great a portion of light coming from one direction. Various attempts have been made to solve this problem, some of them involving the location of sources of direct illumination at different points about the area or space to be illuminated and others utilizing indirect illumination or attempting to diffuse the light by ground glass or other similar light diffusing media. None of these attempts has been successful, however, the first mentioned scheme simply multiplying the number of shadows without sufficiently reducing their intensity and the other schemes being so wasteful of light and so local in effect as usually not to give a sufficiently even distribution of light nor such a direction of the light as will also avoid the tendency to marked shadows.

A general object of the present invention is to provide means for so distributing and directing the light from an artificial source of illumination as entirely to avoid the effect of light localized in source and direction, and, without waste of the light, so to enlarge the area of intrinsic brilliancy of the illuminating means and so to direct the light emanating from this area as to produce a substantial simulation of day-light illumination or of light from the sky in the day time, the invention aiming in general to scientifically direct by reflection or refraction, or both, substantially all of the light from the source of illumination to points where it will serve some useful purpose.

The invention aims particularly to provide a lens which may be used with an ordinary source of illumination, such as an arc light or an incandescent light, preferably in combination with a reflector of ordinary construction or of the novel construction herein disclosed, which will so change the directions of the rays of light radiating from said source, and incident upon said lens either directly or after reflection, as both to effect a substantially even distribution of the light throughout the area to be illuminated and at the same time so to direct the light that each object within the area to be illuminated will have light impinging upon it from different directions.

An important feature of the invention is the construction and arrangement of the prism system which goes to make up the principal part of the lens structure, a particularly important feature of the invention being the variation of the relative inclinations of the refracting surfaces of the respective prisms or prismatic ridges at different points about the axis of the lens. Another important feature of the invention is the novel reflector construction by which light from the brightest parts of the source of light may be reflected to the more remote parts of the prismatic lens, whatever the outer contour of the lens, in order to secure a more uniform brilliancy throughout the lens or, in other words, to cause the lens, which is the immediate source of illumination, to constitute a luminous source of substantially uniform brilliancy.

Other important features and objects of the invention will appear from the following description and claims when considered in connection with the accompanying drawings in which—

Figure 1 is a somewhat diagrammatic vertical section through an illuminating device embodying the present invention, this figure also illustrating the illuminating effect produced by the invention and particularly the illuminating effect produced by the structure shown in Fig. 6;

Fig. 2 is a diagrammatic detail illustrating the paths of certain direct and reflected rays of light when incident upon different parts of the reflecting and refracting means;

Fig. 3 illustrates the illuminating effect upon an object placed at the same distance from the source of light as the object shown in Fig. 1, when the source of light is not associated with the means of the present invention;

Fig. 4 is a front view of a rectangular prismatic lens embodying features of the present invention;

Fig. 5 is a section through the structure shown in Fig. 4 on the line 5—5 of said figure;

Fig. 6 is a perspective detail illustrating the varying relative inclinations of the refracting surfaces of the prismatic ridges of the lens;

Fig. 7 illustrates the light effect produced by one of the prismatic ridges shown in Fig. 6 as compared with the light effect produced by a prismatic ridge having its refracting surfaces uniformly inclined to each other; and Fig. 8 is a perspective view of a special reflector for directing rays of light to the more remote parts of the prismatic lens.

In the embodiment of the invention herein specifically illustrated, the refracting means employed is shown as a lens of substantially square or rectangular outline, see Fig. 4 of the drawings, such a lens having particular utility for some illuminating purposes, but it will be understood that the invention is not restricted to the particular lens outline and that it has equal utility when embodied in many other forms and when combined with other reflectors and other sources of artificial illumination than those herein shown and described.

The lens herein shown is provided with a series of prismatic ridges 2 curved about the axis 4 of the lens, in which axis the source of artificial illumination is to be substantially located, the point of location of the source of illumination along this axis being determined partly by the area of the lens and partly by the refracting power of the respective prismatic ridges of the lens, this distance being predetermined and the relative inclinations of the refracting surfaces of the prismatic ridges being also predetermined with respect to the point of location of the source of illumination. This point of location is also properly related to the shape of the reflector associated with the lens and light.

Each of the prisms or prismatic ridges tapers away from the lens axis, whereby it tends to bend the light from the source of illumination back toward said axis, and each of the ridges, as shown in Fig. 6 of the drawings, preferably has a varying inclination of its refracting surfaces at different points about the lens axis, the edge of the base of each prism which appears upon the outer face of the lens presenting a sinuous outline having high spots 6 and low spots 8, as shown in Fig. 6 of the drawings. The high and low spots of successive prism bases are preferably staggered with respect to each other so that the light distributing effect of the waved surfaces of the successive prisms will overlap, thus effecting not only an even distribution of the light but an illumination made up of rays coming from different directions.

For convenience in forming, handling and mounting the lens or lens parts, the prismatic ridges are preferably formed upon one surface only of the lens, as shown in Figs. 1, 2, 5 and 6, the other surface being plane. Moreover, when the lenses are to be made in relatively large sizes, as for example 24 inches square, a size which I have found particularly useful, it is advantageous to form the lens of sections, for example, the four rectangular sections which are shown in Fig. 4. It will be noted that these four sections can be formed from one mold. The manner of mounting these four sections to form a lens is also shown in Figs. 4 and 5, each section being provided with a narrow margin 10 adapted to fit in channel frame members 12 constituting the outer frame, and in I frame members 14 constituting the cross bars of the frame. By reason of the multiplicity of the directions in which light travels from the lens sections, these frame members do not cast a noticeable shadow.

In Fig. 7 of the drawings is illustrated the illuminating effect of one of the individual prisms having the variable relative inclination of the refracting surfaces as compared with the illuminating effect of a prism having the refracting surfaces at a uniform inclination to each other. The illuminating effect of the novel prism construction illustrated in Fig. 6 is shown by the waved band 16 of uneven width, while the illuminating effect of an ordinary prism of uniform cross-section is shown by the band 18.

In Fig. 1 of the drawings, the illuminating effect of applicant's illuminating means is illustrated as compared with ordinary illuminating devices such as shown in Fig. 3, the rays $a$ representing those from the low points 8 in the prismatic ridges, while the rays $b$ represent rays from the high points of the prismatic ridges. The distribution of the light is thus shown in Fig. 1, and, at the same time, by reference to the globular object 20 shown in this figure not only is the more extensive illumination effected by the broad area of intrinsic brilliancy illustrated but also the dissipation of marked shadows by reason of the light striking the object from a number of different directions.

In order to utilize, as far as possible, all of the light emanating from the source of light, such, for example, as the arc light 22 shown in Fig. 1 of the drawings, the refracting power of the prismatic ridges is preferably graduated from the axis of the lens outward, the outermost ridge having the greatest refracting power, as shown in Fig. 5 of the drawings. This graduation may of course be varied to obtain any desired distribution of the rays radiating from the light source from parallelism to marked divergency, but preferably the lens is made large enough so that too marked divergence is not required to illuminate the area intended to be illuminated by the illuminating means and thus the even distribution of the light over this area can more easily be effected. From an inspection of Fig. 5 of the drawings it will be noted that the angle of relative inclination of the two refracting surfaces of the outermost prism is considerably greater than the angle of inclination of the two refracting surfaces of the innermost prism.

To collect and utilize all the rays from the source of artificial illumination, a reflector is preferably associated with the lens, such, for example, as the reflector 24, which may be of substantially parabolic contour. To meet special conditions as, for example, when using a rectangular lens such as shown in Fig. 4, a specially shaped reflector may be placed behind the source of illumination and particularly in the region of the brightest part of said source, in order to reflect light from this source to the remote parts of the lens which ordinarily would not receive as much light as the other parts of the lens. For example, a pyramidal reflector 26 may be formed in the central part of a reflector 28 placed behind the source of artificial illumination 22, the reflector 26 having its sides so located with respect to the corners of the rectangular lens illustrated in Fig. 4 and so inclined with respect to the source of light 22 as to direct a considerable amount of the light from the brightest part of the source 22 into the remote corners of the rectangular lens, thus insuring substantially uniform brilliancy of the lens as an illuminating means.

From the foregoing description it will be seen that by the present invention there has been provided means for utilizing substantially all of the light from an artificial source of illumination to illuminate an area or space which it is desired to illuminate and yet so to diffuse and direct this light as to avoid marked shadow effects and at the same time obtain substantially uniform illumination throughout the area or space to be illuminated. It will also be seen that there is very little loss of light due to absorption as compared with devices heretofore used, since the lens is entirely transparent and the reflector or reflectors may be made as nearly perfect for their purpose as possible without danger of glare or shadow effects from this source. Not only are all of the advantages obtained which may be obtained by any of the translucent diffusing means heretofore employed so far as avoiding excessive light from certain directions is concerned, but by means of the present invention there is a more even distribution of the light, there is a broader area of intrinsic brilliancy in the illuminating means, there is very much less waste of light by absorption and by inefficient direction, and there is a much more marked simulation of daylight.

What I claim as new is:

1. In apparatus of the class described, a lens adapted to be employed with a source of artificial illumination, said lens comprising a plurality of prismatic ridges curved about a common axis in which the light source is to be located, each of said ridges tapering from said axis and the optical base of each having a sinuous edge with a corresponding variation of the apex angles or relative inclinations of the refracting surfaces.

2. In apparatus of the class described, the combination with a lens adapted to be employed with a source of artificial illumination and comprising a plurality of prismatic ridges curved about and tapering from a common axis in which the light source is to be located, of a collecting reflector coöperating with said lens and light source, said reflector comprising also a portion located axially behind the light source and shaped to reflect rays to the outer prismatic ridges.

3. In apparatus of the class described, a lens adapted to be employed with a source of artificial illumination and comprising a plurality of prismatic ridges curved about a common axis in which the light source is to be located, said ridges being of substantially uniform width in the plane of the lens but having high and low spots and the high and low spots of successive ridges being in staggered relation.

4. In apparatus of the class described, the combination with a lens comprising a plurality of prismatic ridges extending around, tapering away from and located at different distances from a common axis in which the light source is to be located, of a reflector shaped and located to direct light from one of the brightest parts of the source to the remote ridges of the lens.

5. In apparatus of the class described, light distributing means comprising a plate having thereon a series of prismatic ridges which have a varying inclination of the refracting surfaces at different points along the respective ridges.

6. Light distributing means comprising a plate having formed therein a series of prismatic ridges with varying apex angles between the refracting surfaces at different points along the respective ridges.

7. Light distributing means comprising a plate having formed therein a series of substantially parallel ridges which have a varying inclination of the refracting surfaces at different points along the respective ridges.

8. Light distributing means comprising a plate having formed therein a series of substantially parallel prismatic ridges with varying apex angles between the refracting surfaces at different points along the respective ridges.

9. Light distributing means comprising a plate having formed therein a series of prismatic ridges which have a varying inclination of the refracting surfaces at different points along the ridges, said variation being gradual in both directions, whereby a section through said refracting surfaces in a plane parallel to the prism apex has one edge in the form of a sinuous curve.

10. Light distributing means comprising a plate having formed therein a series of prismatic ridges with varying apex angles between the refracting surfaces at different points along the respective ridges, the greater and smaller apex angles of the respective ridges being staggered with respect to the corresponding angles of adjacent ridges.

Signed at New York city, N. Y., this 7th day of April, 1919.

LAWRENCE X. CHAMPEAU.